United States Patent [19]

Kuehl

[11] Patent Number: 4,520,519
[45] Date of Patent: Jun. 4, 1985

[54] APPARATUS FOR REMOVING HONEY FRAMES FROM SUPERS

[76] Inventor: Lawrence J. Kuehl, Loup City, Nebr. 68853

[21] Appl. No.: 530,955

[22] Filed: Sep. 12, 1983

[51] Int. Cl.$^3$ ............................................. A01K 51/00
[52] U.S. Cl. ...................................................... 6/12 R
[58] Field of Search ...................... 6/12 R, 12 A, 12 M

[56] References Cited

U.S. PATENT DOCUMENTS

| | | | |
|---|---|---|---|
| 2,108,480 | 2/1938 | Foster | 6/12 R X |
| 3,581,324 | 6/1971 | Davidson, Jr. | 6/12 A |
| 3,735,433 | 5/1973 | Smith | 6/12 A |
| 4,346,490 | 8/1982 | Katz et al. | 6/12 R X |

FOREIGN PATENT DOCUMENTS 210554  3/1968  U.S.S.R. ............................... 6/12 R

Primary Examiner—Robert P. Swiatek
Attorney, Agent, or Firm—Zarley, McKee, Thomte, Voorhees & Sease

[57] ABSTRACT

An apparatus for removing frames from honey supers comprising a lift mechanism adapted to receive a plurality of stacked supers and to raise the same to enable the uppermost super to be pushed laterally therefrom by means of a horizontally extending push-off arm. The frames are pushed upwardly from the super removed from the stack and are conveyed laterally into a scraping area wherein the wax is scraped from the top and bottom bars of the frames. The scraped frames are then moved laterally on the machine towards an operator who manually removes the scraped frames from the apparatus and delivers the same to a decapping machine. The operation is continuous so that successive supers are moved through the machine with the frames being removed therefrom and scraped.

4 Claims, 6 Drawing Figures

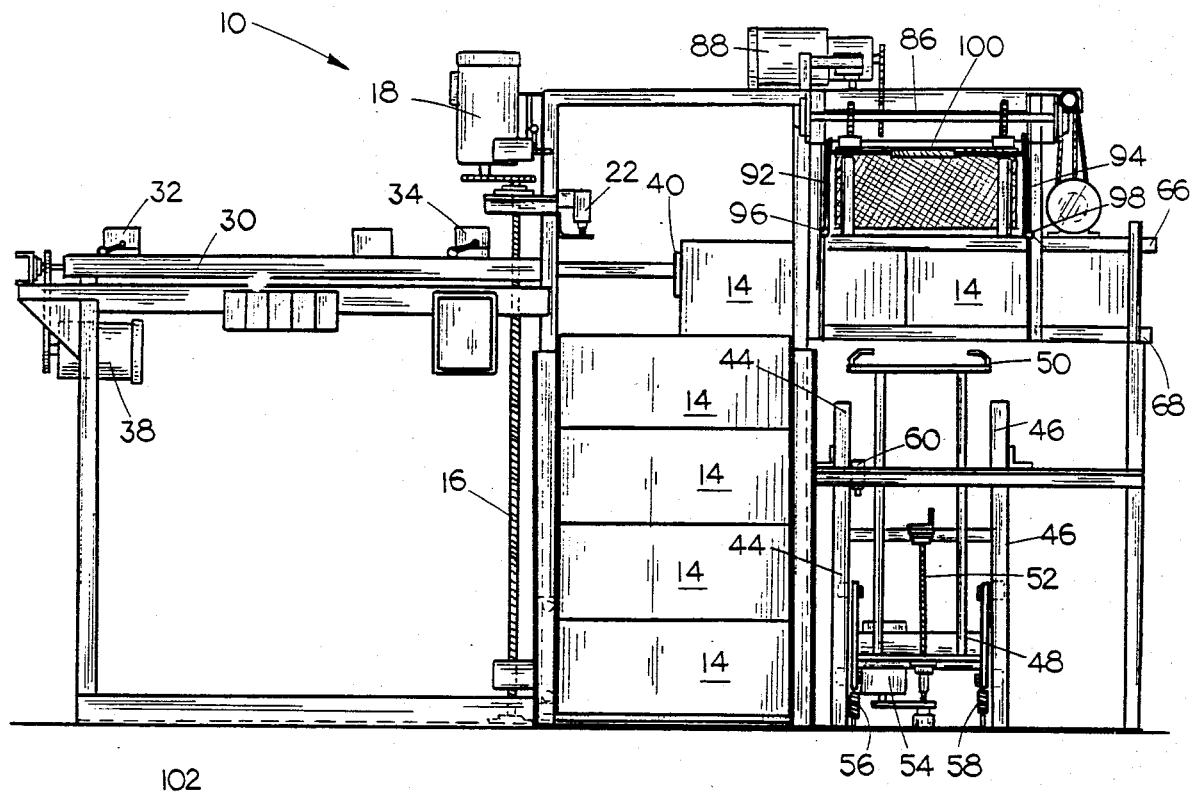
FIG 2
FIG 6
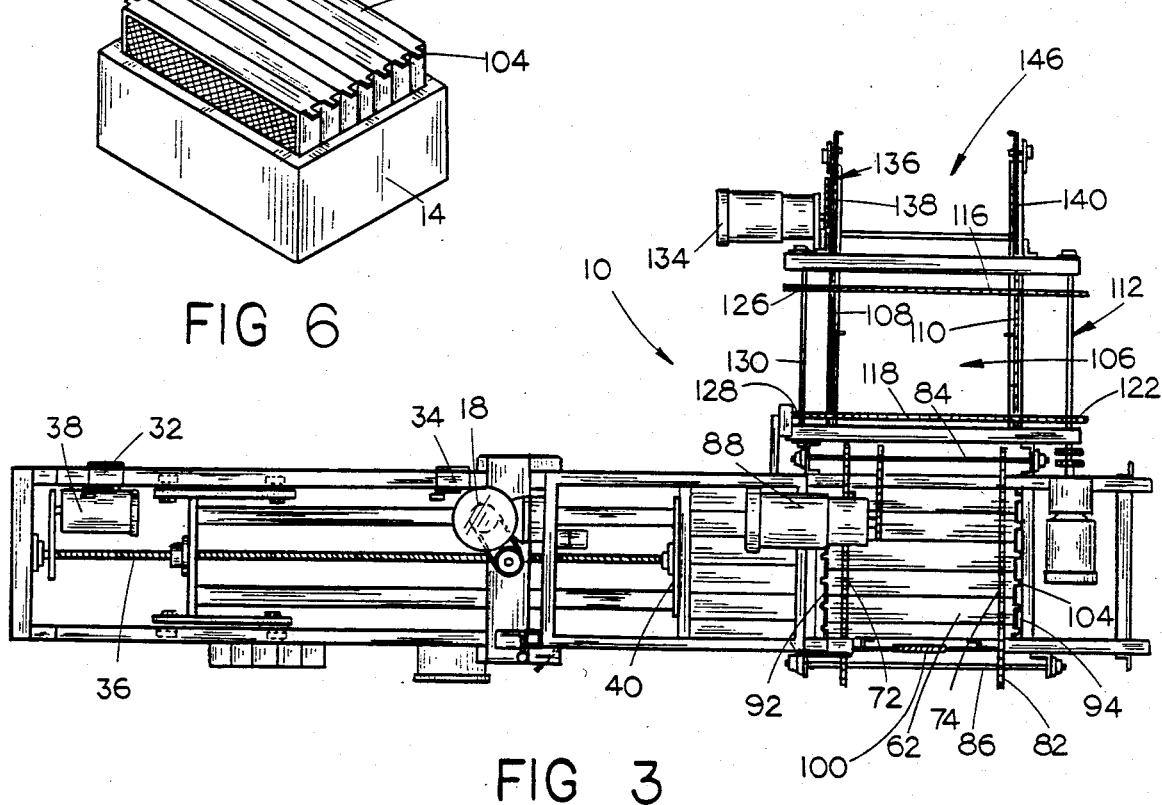
FIG 3

200~# APPARATUS FOR REMOVING HONEY FRAMES FROM SUPERS

BACKGROUND OF THE INVENTION

Beekeepers usually place supers in fields or the like to enable bees to gather honey. The supers are rectangular boxes having open upper and lower ends. Rectangular frames are positioned within each of the supers and comprise combs positioned between upper, lower, and opposite side bars. The bees deposit the honey in the combs and then cap the same with "burr comb" wax. The wax not only covers the combs but also covers the frames.

In honey processing plants, it is necessary to remove the frames from the supers and to then uncap the frames or combs for further processing. Heretofore, the frames have been manually removed from the supers and then manually separated from each other. The removal of the frames from the super is difficult and time-consuming due to the fact that the wax on the frames causes the frames to adhere to the interior surfaces of the supers. The wax also makes it difficult to separate the individual frames from one another.

SUMMARY OF THE INVENTION

It is therefore a principal object of the invention to provide an apparatus for removing frames from supers and to scrape the "burr comb" wax from the top and bottom bars. The apparatus comprises a vertically movable hoist adapted to support a plurality of supers one upon the other. A super pushoff arm assembly is positioned laterally of the hoist and is off arm assembly is positioned laterally of the hoist and is adapted to push the uppermost super from the stack laterally therefrom into a first super holding area. A vertically movable lift assembly is positioned below the first super holding area and is adapted to push the frames upwardly from the super into a second super holding area. A conveyor conveys the removed frames to a third super holding area at which a scraper assembly scrapes the "burr comb" wax from the top and bottom bars of the frames. Another conveyor conveys the scraped frames laterally from the apparatus to an operator station. The operator will remove the scraped frames from the apparatus and will feed the same to an uncapping mechanism.

A principal object of the invention is to provide an apparatus which removes the honey frames from the supers in a convenient and rapid manner.

A further object of the invention is to provide an apparatus which not only removes frames from supers but which scrapes the "burr comb" wax from the top and bottom bars of the frames.

A further object of the invention is to provide an apparatus for removing frames from honey supers which greatly expedites the entire process of removing frames from supers.

Yet another object of the invention is to provide an apparatus for removing honey frames from supers which is economical of manufacture and durable in use.

These and other objects will be apparent to those skilled in the art.

BRIEF DESCRIPTION OF THE DRAWINGS

FIG. 2 is a side view of the apparatus illustrating the uppermost super being moved laterally from a stack of supers;

FIG. 3 is a top view of the apparatus;

FIG. 6 is a perspective view illustrating frames being removed from a super.

DESCRIPTION OF THE PREFERRED EMBODIMENT

Figure 1:
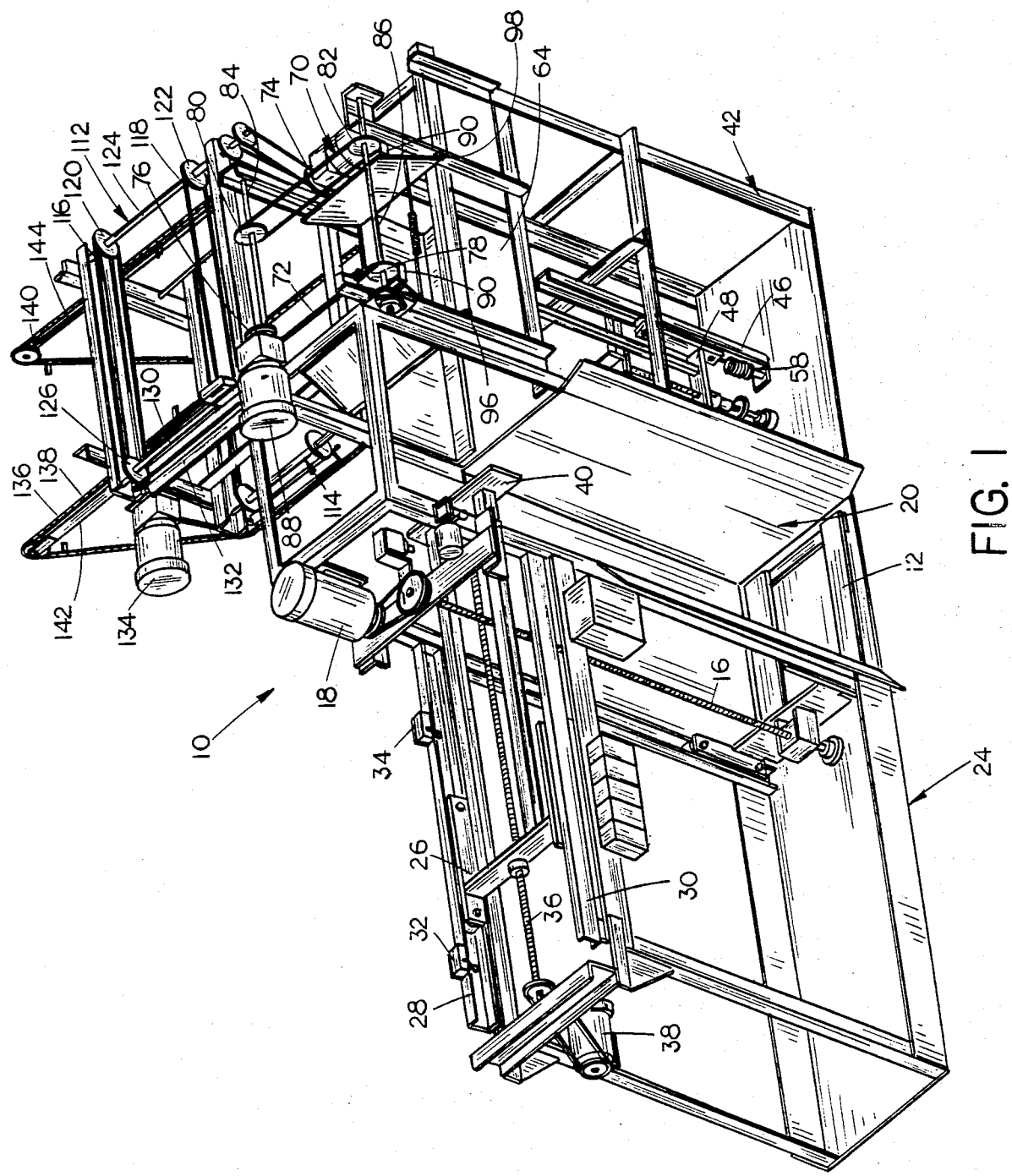
FIG. 1 is a perspective view of the apparatus of this invention.
Figure 4:
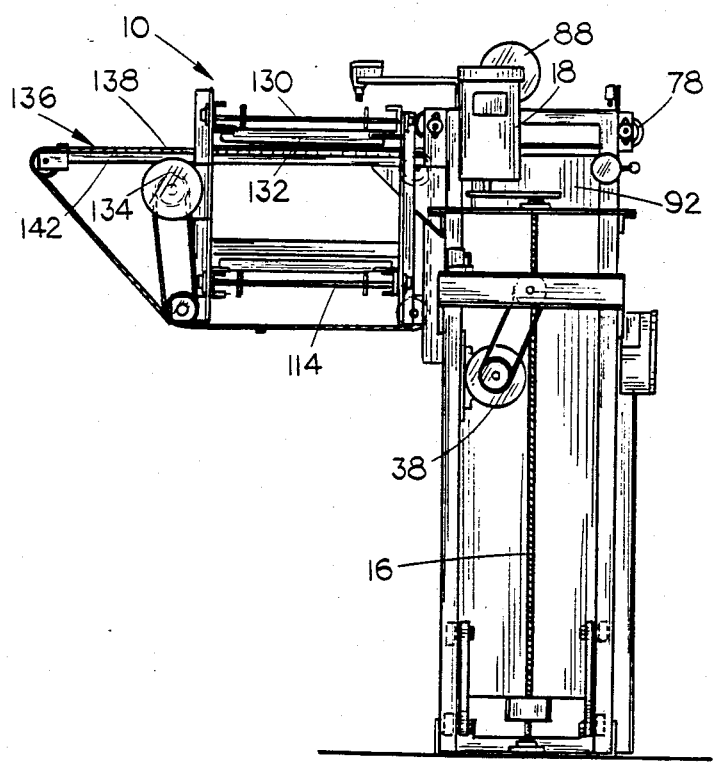
FIG. 4 is an end view of the apparatus as seen from the left of FIG. 3.
Figure 5:
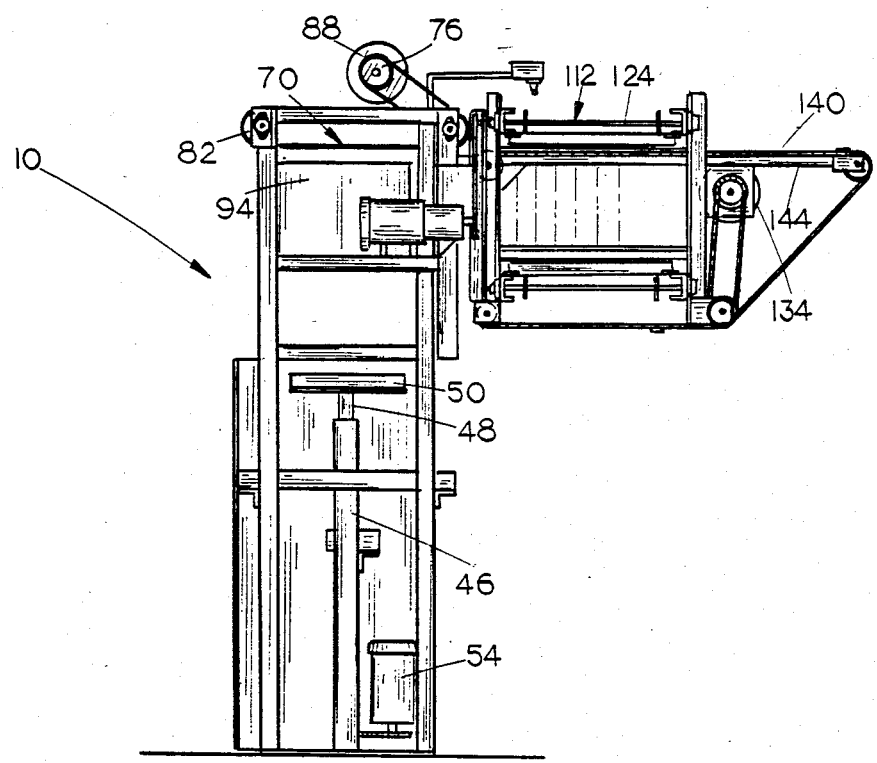
FIG. 5 is an end view of the apparatus opposite to that of FIG. 4.

The apparatus of this invention is referred to generally by the reference numeral 10. Positioned within apparatus 10 is a super support 12 which is vertically movable from the position of FIG. 1 to enable a stack of supers 14 to be successively handled. Support 12 is vertically movable by means of screw mechanism 16 driven by electric motor 18. For purposes of description, the area above support 12 in FIG. 1 will be referred to generally as stack-receiving area 20 having a switch mechanism 22 positioned at the upper end thereof adapted to sense when the uppermost super 14 has reached the proper height.

Framework 24 is positioned laterally of the receiving area 20 and includes a carriage 26 which is movably mounted on frame members 28 and 30. Limit switches 32 and 34 are mounted on frame member 28 to sense the position of carriage 26. Carriage 26 is moved horizontally on frame members 28 and 30 by means of screw assembly 36 driven by motor 38. The inner end of screw assembly 36 is provided with a push bar 40 which is adapted to engage the side of the uppermost super 14 and to move the same laterally as indicated in FIG. 2 when the switch 22 has sensed the proper position of the uppermost super 14. Push arm 40 is moved laterally by the motor 38 until switch 34 is activated by the carriage at which time the motor 38 is reversed to return the push arm 40 to the left as viewed in FIG. 2 until carriage 26 activates switch 32.

Framework 42 is positioned laterally of receiving area 20 opposite to framework 24 and includes a pair of vertically disposed and horizontally spaced channel members 44 and 46 having vertically movable carriage 48 mounted thereon. Carriage 48 is provided with a push plate 50 mounted at the upper end thereof. Carriage 48 is vertically movable by means of the screw assembly 52 which is driven by motor 54. Springs 56 and 58 are provided beneath carriage 48 to provide a cushioning effect when the carriage is lowered. Limit switch 60 is provided in the path of carriage 48 and is adapted to cause the motor 54 to reverse thereby lowering carriage 48 when the carriage 48 reaches the predetermined height. Push plate 50 is adapted to engage the underside of the frames 62 in the super 14, when super 14 is properly positioned thereover, to move the frame 62 upwardly from the super 14. For purposes of description, the area above push plate 50 will be described as being super receiving area 64 which is defined by upper and lower pairs of opposing angle members 66 and 68. The angle members 66 and 68 receive the super 14 as it is being moved laterally by the push arm 40 and the spaced-apart angle members 66 and 68 prevent the super 14 from moving either upwardly or downwardly relative thereto.

A conveyor means 70 is mounted on the apparatus above receiving area 64 and comprises a pair of spaced-apart conveyor chains 72 and 74 mounted on sprockets 76, 78 and 80, 82, respectively. Sprockets 76 and 80 are mpunted on shaft 84 while sprockets 78 and 82 are mounted on shaft 86. Shaft 84 is driven by means of electric motor 88. As seen in the drawings, each of the chains 72 and 74 is provided with plates 90 which are adapted to engage the outside surface of the upper bar on the outermost frame 62 to move or convey the frames 62 laterally from area 64 as will be described in more detail hereinafter.

An important feature found in area 64 is the spring-loaded plates 92 and 94 which are pivoted at their lower ends at 96 and 98. A spring 100 extends between the upper ends to yieldably urge the same towards one another. As the frames 62 are moved upwardly between plates 92 and 94 by the push plate 50, the upper ends of the frames 62 engage the inner surfaces of the plates 92 and 94 and separate the same as they move upwardly relative thereto. The frames 62 are moved upwardly between the plates 92 and 94 until the lips or shoulders 102 and 104 on the upper ends of the frames 62 are positioned at the top edges of the plates 92 and 94. The lips 102 and 104 are supported on the upper edges of the plates 92 and 94 until and as they are moved laterally by the elements 90.

The frames 62 are moved laterally by the conveyor 70 until they are positioned in the frame receiving area referred to generally by the reference numeral 106. In area 106, the lips 102 and 104 are supported upon spaced-apart frame members 108 and 110. Scraper assemblies 112 and 114 are positioned above and below the frames 62 in the area 106 for scraping the "burr comb" wax from the upper and lower bars on the frames 62. Scraper assembly 112 comprises chains 116 and 118 mounted on sprockets 120 and 122 positioned on shaft 124. The other ends of the chains 116 and 118 extend around sprockets 126 and 128 mounted on shaft 130. Scraper bar 132 is secured to the chains 116 amd 118 and extends therebetween. Rotation of the chains 116 and 118 by the motor 134 causes the scraper 132 to pass over the upper portions of the upper bars on the frames 62 to scrape the wax therefrom. The scraper assembly 114 is positioned below the frames and functions in the same manner to scrape the wax from the lower or bottom bars of the frames 62. After the wax has been scraped from the top and bottom bars of the frames 62, conveyor means 136, comprised of chains 138 and 140, engages the frames to move the same laterally on the supports 142 and 144. For purposes of description, the area between the outer ends of the chains 138 and 140 will be referred to as frame receiving area 146. An operator is positioned adjacent area 146 and would manually remove the frames from the area 146 and feed the same to a decapping machine closely adjacent to the apparatus. In operation, the stacked supers 14 are positioned in the area 20 and the uppermost super is moved laterally therefrom into the area 64 wherein the frames 62 are moved upwardly from the super 14 by means of the push plate 50. The conveyor means 70 then conveys the frames laterally from area 64 into area 106. At that time, the lift or hoist 12 would have raised the next super to position and push arm 40 will then move the next super into the area 64. In other words, the operation is a continuous operation so that frames are constantly removed from the supers and are constantly moved through the apparatus. When the supers are in area 106, they are scraped as previously described to aid in the separation of the frames. The scraped frames are then moved to the area 146.

It can be seen that the apparatus disclosed herein provides a convenient and rapid means for removing the frames from supers and for scraping the "burr comb" wax therefrom to enable the frames to be readily separated for individual feeding into a decapping machine.

Thus it can be seen that the apparatus of this invention accomplishes at least all of its stated objectives.

I claim:

1. An apparatus for removing the frames from honey supers, comprising:
    a frame means,
    a first support means on said frame means adapted to receive a stack of honey supers thereon,
    first means for horizontally laterally moving the uppermost super from the stack to a first holding area on said frame means,
    second means on said frame means for vertically removing the frames from the super which is held in said first holding area,
    conveyor means on said frame means for moving the removed frames to a second holding area on said frame means for subsequent removal from the frame means,
    said first means comprising a horizontally movable push arm which engages the uppermost super and pushes the same laterally to said first holding area.

2. The apparatus of claim 1 wherein said second means comprises a vertically movable push arm positioned below said first holding area which engages the frames and pushes the same upwardly from the super in said first holding area.

3. An apparatus for removing the frames from honey supers, comprising,
    a frame means,
    a first support means on said frame means adapted to receive a stack of honey supers thereon,
    first means for horizontally laterally moving the uppermost super from the stack to a first holding area on said frame means,
    second means on said frame means for vertically removing the frames from the super which is held in said first holding area,
    conveyor means on said frame means for moving the removed frames to a second holding area on said frame means for subsequent removal from the frame means,
    said conveyor means comprising a first conveyor portion which conveys the removed frames laterally from said first holding area to a frame scraping area, and a second conveyor portion for conveying the frames laterally from said scraping area.

4. The apparatus of claim 3 wherein a frame scraper means is positioned above and below said scraping area for scraping the upper and lower portions of the frames.

* * * * *